United States Patent [19]

Lieber et al.

[11] 4,310,857
[45] Jan. 12, 1982

[54] PROXIMITY FOCUSED STREAK TUBE AND CAMERA USING THE SAME

[76] Inventors: Albert J. Lieber, 107 Bandolier Ave.; Howard D. Sutphin, 112 Shirlane Pl., both of Los Alamos, N. Mex. 87544

[21] Appl. No.: 834,466

[22] Filed: Sep. 19, 1977

[51] Int. Cl.³ .............................................. H04N 5/30
[52] U.S. Cl. ................................................ 358/217
[58] Field of Search .............................. 358/217, 111

[56] References Cited

U.S. PATENT DOCUMENTS

| | | | |
|---|---|---|---|
| 3,374,380 | 3/1968 | Goodrich | 313/105 CM |
| 3,735,032 | 5/1973 | Goetze et al. | 358/901 |
| 3,974,411 | 8/1976 | Faulkner et al. | 313/105 CM |
| 4,015,115 | 3/1977 | Corcoran | 358/901 |

*Primary Examiner*—Richard Murray
*Attorney, Agent, or Firm*—Flehr, Hohbach, Test, Albritton & Herbert

[57] ABSTRACT

Proximity focused streak tube having a photocathode for converting photon images from a source into photoelectrons. A phosphorous screen is provided for receiving the photoelectrons. The photocathode and the screen define a longitudinal tube axis. A channel plate is provided having a plurality of substantially parallel bores that are disposed in close proximity to the photocathode so that the bores in the channel plate are inclined at an angle with respect to the longitudinal tube axis. A voltage source supplies a voltage difference between the photocathode and the channel plate to cause electrons to be extracted from the photocathode and to be accelerated through the bores in the channel plate. The bores in the channel plate are inclined at an angle in such a manner so that there cannot be a direct feedthrough of X-rays to the phosphorous screen and also preventing a direct feedthrough of visible light. First and second spaced apart beam electrodes are disposed between the channel plate and the phosphorous screen. A voltage source supplies a voltage differential between the beam electrodes to cause the photoelectrons to move in directions across the screen. The beam electrodes are arranged so that their profiles are asymmetric of the tube axis to compensate for the inclination of the channel plate with respect to the tube axis.

6 Claims, 15 Drawing Figures

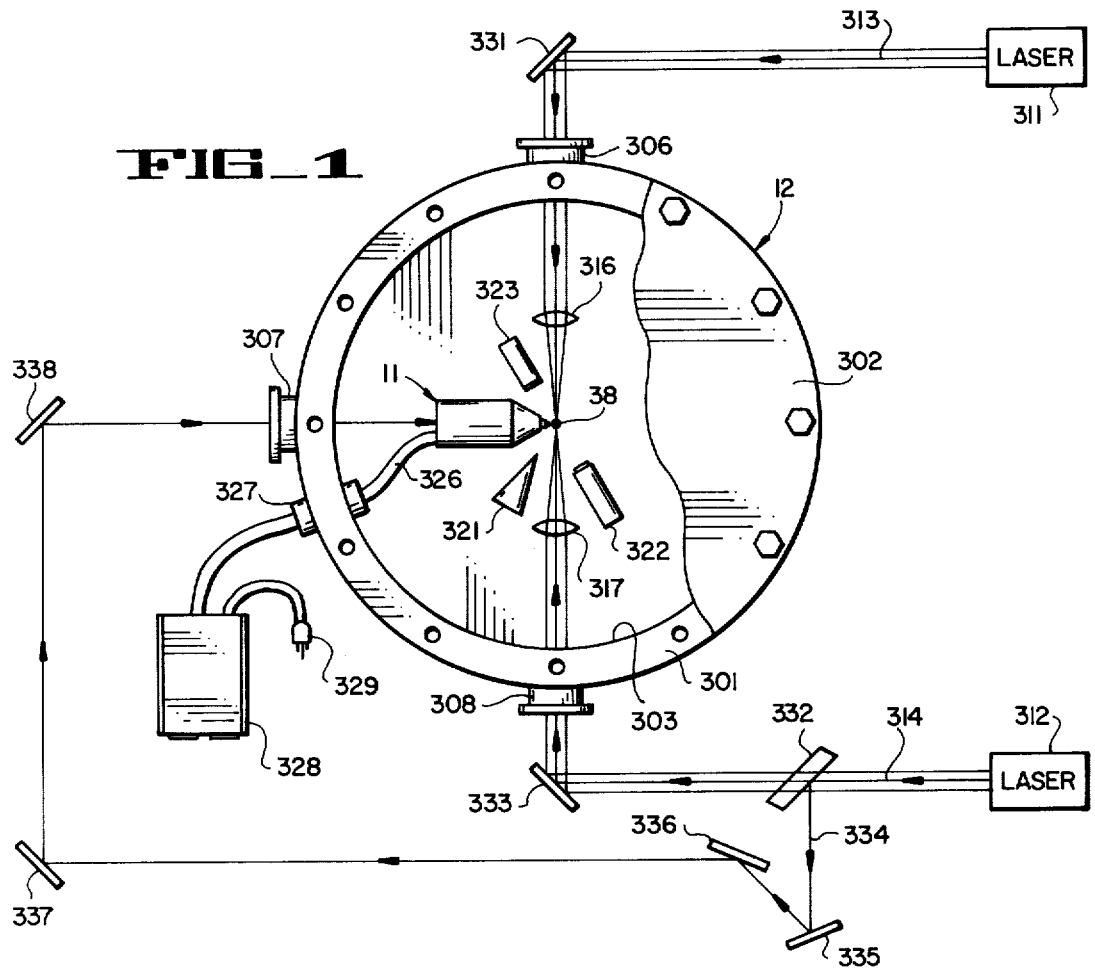
FIG_1
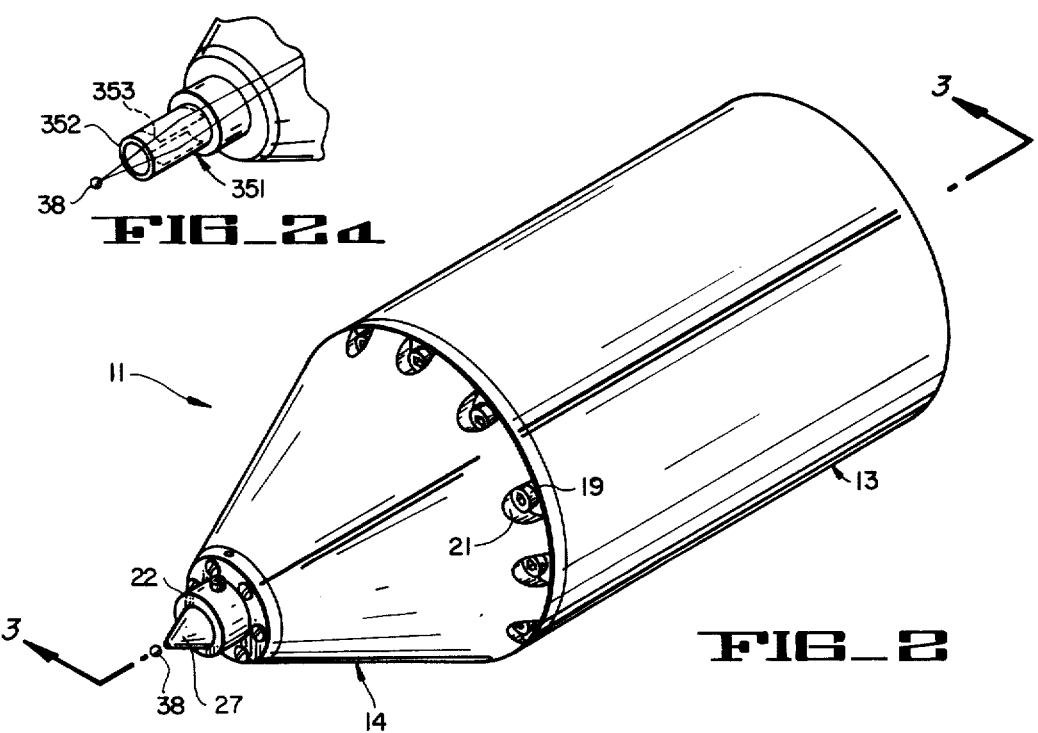
FIG_2A
FIG_2

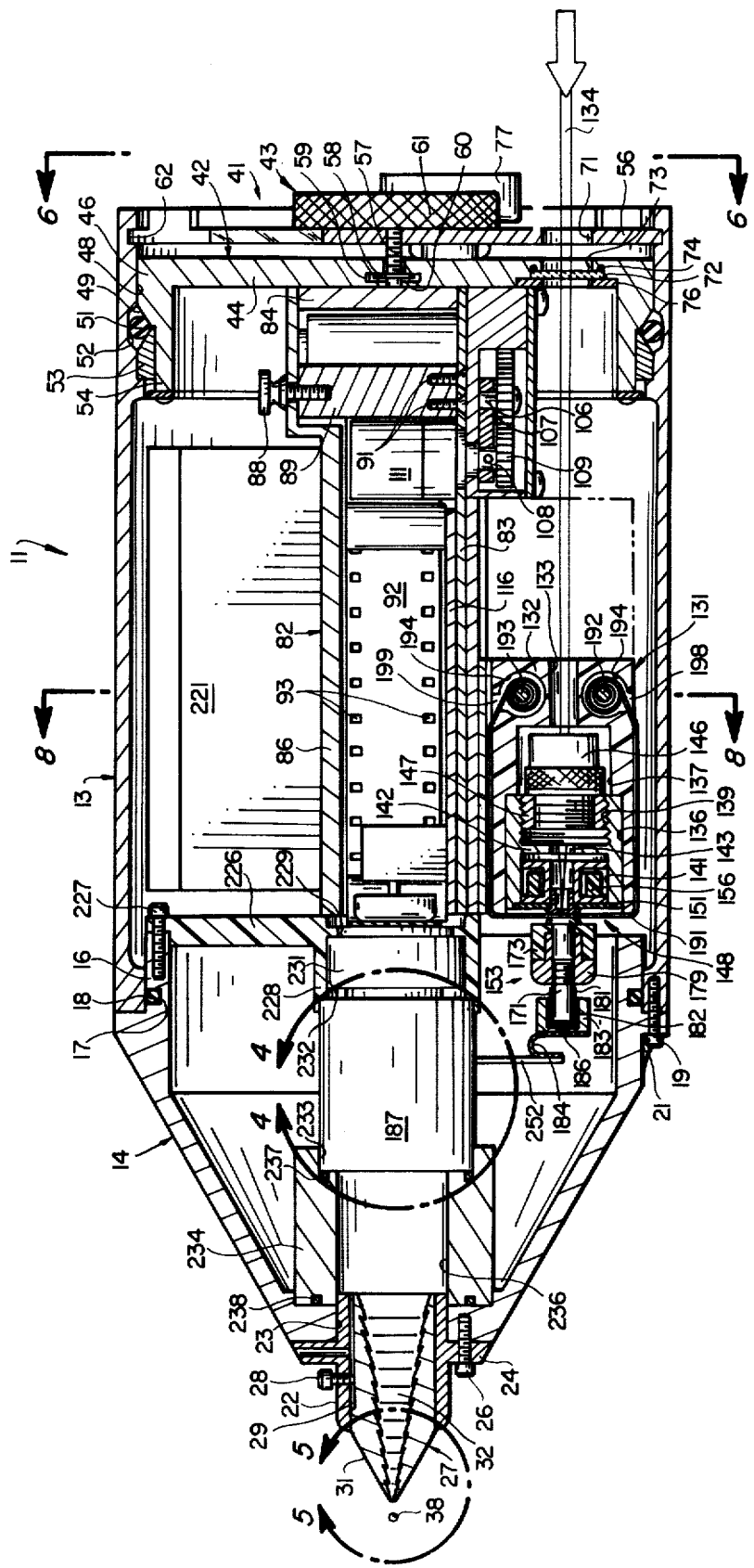
FIG_3

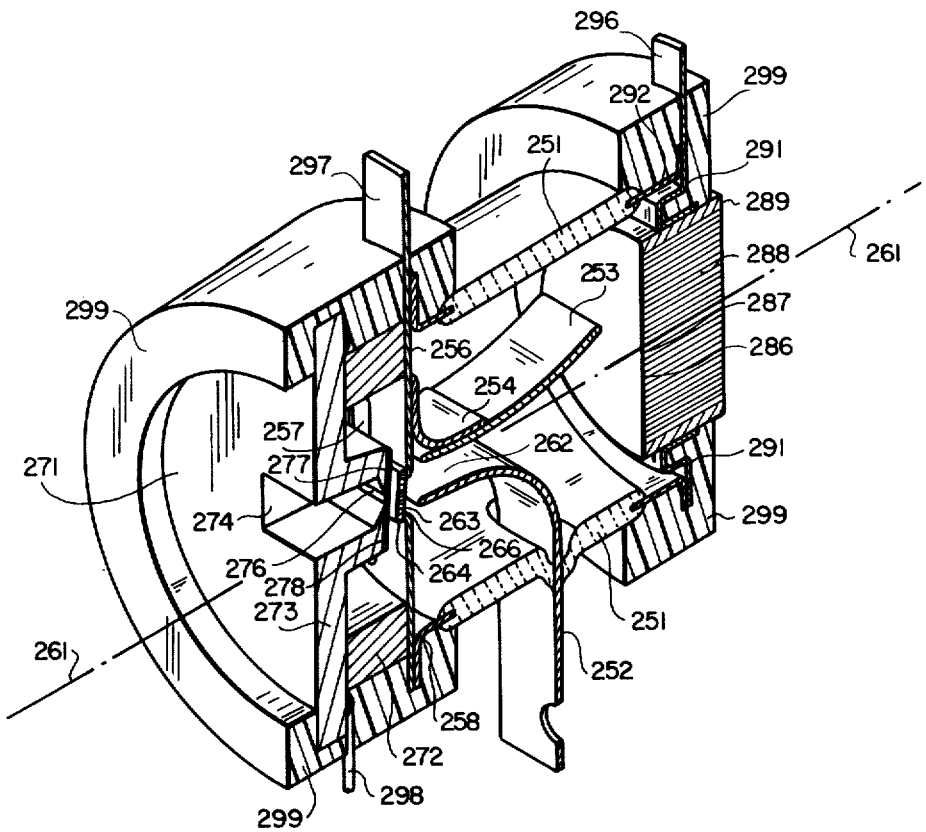
FIG_4
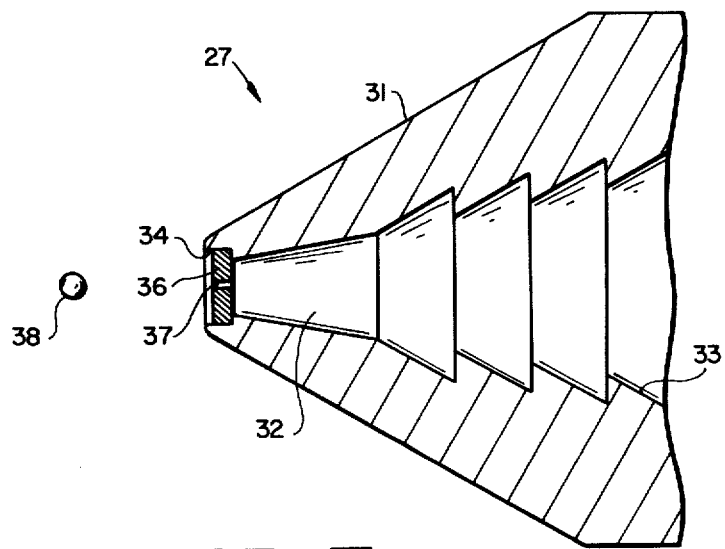
FIG_5

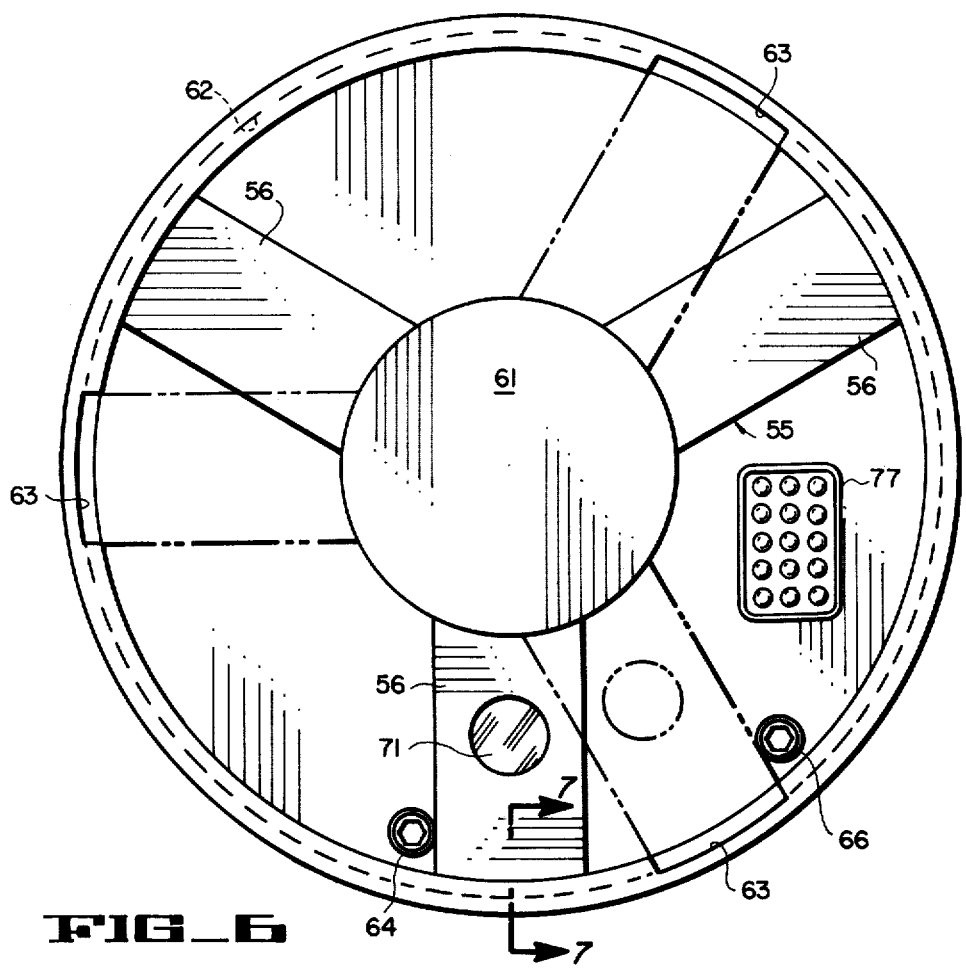
FIG_6
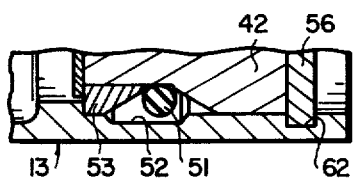
FIG_7a
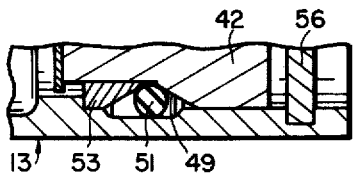
FIG_7b
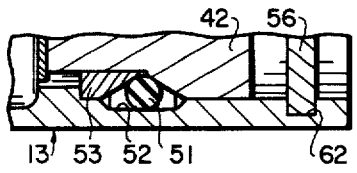
FIG_7c

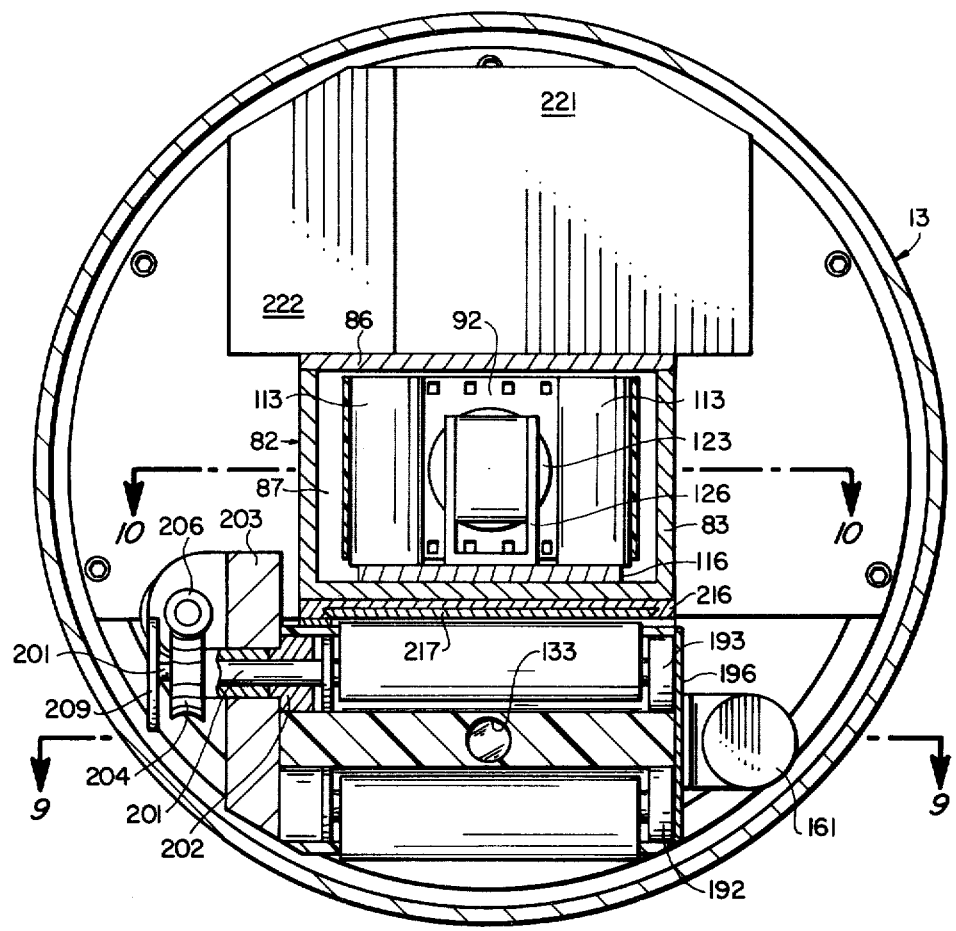
FIG_8
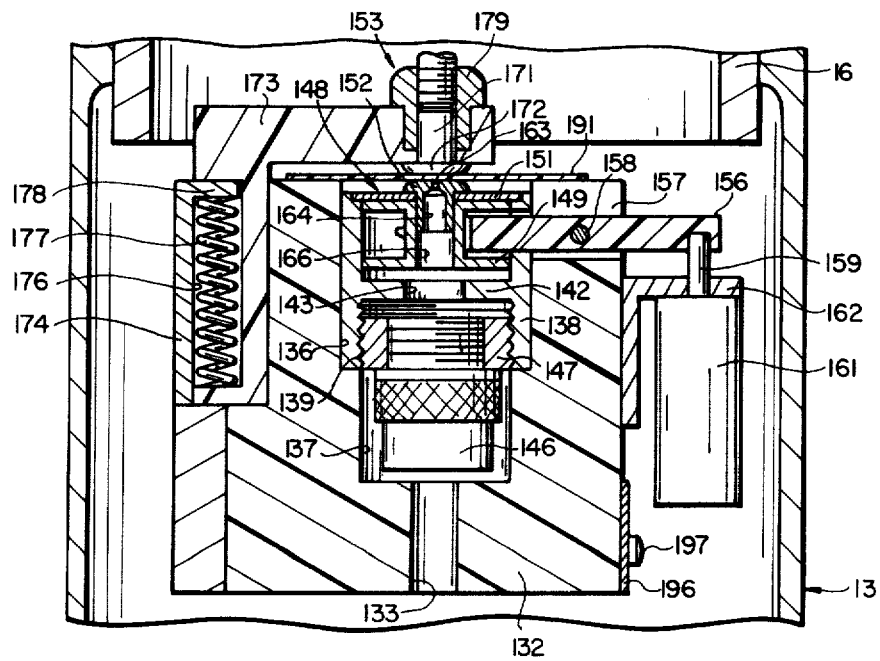
FIG_9

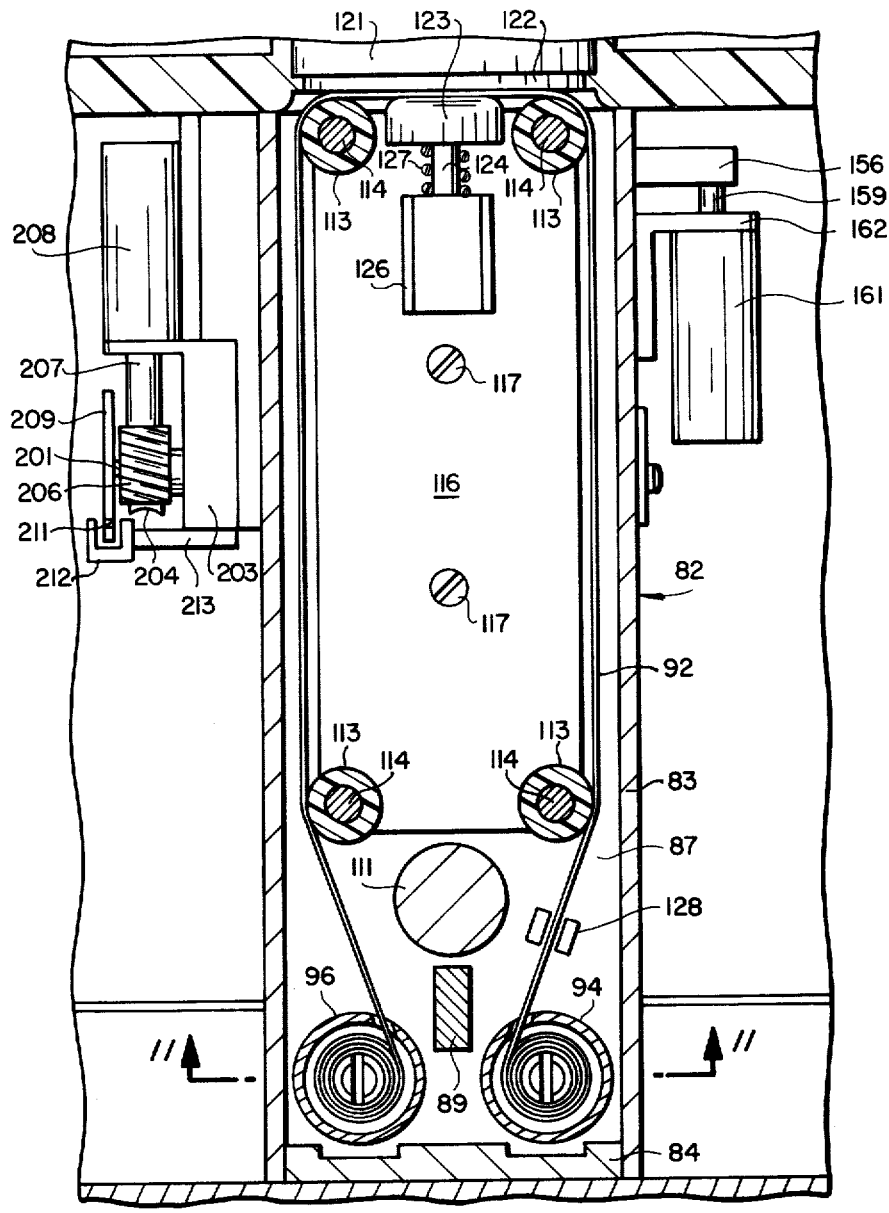
FIG_10
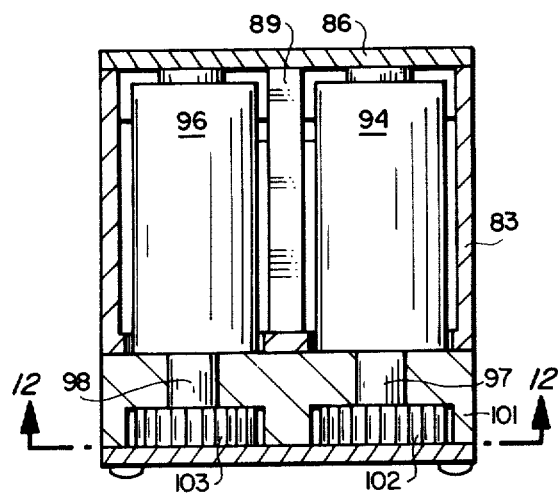
FIG_11
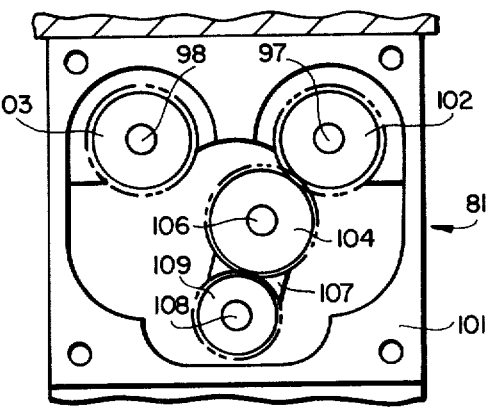
FIG_12

PROXIMITY FOCUSED STREAK TUBE AND CAMERA USING THE SAME

BACKGROUND OF THE INVENTION

In U.S. Pat. No. 3,761,614 issued to Daniel G. Bradley, on an Electron-Optical Image Tube and Image Tube Streak Cameras, there is disclosed the use of a grid in front of a focus electrode for increasing the extraction field in the vicinity of the cathode in order to accelerate the photoelectrons up to a high velocity as rapidly as possible so as to minimize the time dispersion in the vicinity of the photocathode which would limit the resolution of the tube. Such a construction has an inherent disadvantage in that Bradley utilizes a pinhole type of optics. Bradley's tube construction is such that it must be relatively long and therefore permits greater dispersion of the electrons in the electron beam.

In copending application, Ser. No. 755,266, filed on Dec. 29, 1976, there is a streak camera tube disclosed which utilizes a channel plate having bores which are in alignment with the tube axis. It has been found that such a tube has disadvantages in that it permits direct feedthrough of X-rays as well as visible photons. There is therefore a need for a new and improved streak tube. In addition, there is a need for a new and improved camera utilizing such a streak tube.

SUMMARY OF THE INVENTION AND OBJECTS

The proximity focus streak tube consists of a photocathode which is utilized for converting photon images into photoelectrons. Phosphorous screen is provided for receiving the photoelectrons with the photocathode and the phosphorous screen being positioned to define a longitudinal tube axis. A micro channel plate having a plurality of substantially parallel bores therein is disposed in close proximity to the photocathode and is positioned so that the bores in the channel plate are inclined at an angle with respect to longitudinal tube axis. This eliminates direct feedthrough of visible photons as well as X-rays. Means is provided for applying a high voltage differential between the photocathode and the channel plate to cause rapid acceleration of the electrons extracted from the photocathode and to be accelerated through the bores in the channel plate. First and second spaced apart beam electrodes are disposed between the channel plate and the phosphorous screen. Means is provided for applying a voltage differential between the beam electrodes to cause the photoelectrons to move in directions across the phosphorous screen. The beam electrodes are arranged asymmeterically of the tube axis to compensate for the inclination of the channel plate. The tube itself is kept very short so as to minimize drifting or scattering of the electrons in the electron beam so as to maintain resolution.

In general, it is an object of the present invention to provide a proximity focused streak tube in which direct feedthrough of visible photons as well as X-rays is minimized.

Another object of the invention is to provide a streak tube of the above character which is of very short length so as to minimize the dispersion of the electrons in the electron beam so as to maintain resolution of the tube.

Another object of the invention is to provide a streak tube of the above character in which high voltage fields are utilized.

Another object of the invention is to provide a streak tube in which the phosphorous screen is in close proximity to the photocathode.

Another object of the invention is to provide a streak tube of the above character in which microsquare channels or bores are utilized in the channel plate and in which the channel plate is tilted so that the channels are tilted at an angle with respect to the tube axis.

Another object of the invention is to provide a streak tube of the above character in which asymmetric beam electrodes are utilized to counteract the effect of tilted channel plate.

Another object of the invention is to provide a streak tube of the above character in which a tilted channel plate is utilized.

Another object of the invention is to provide a camera utilizing a streak tube which can be readily used in a high vacuum.

Another object of the invention is to provide a camera of the above character which can be placed in close proximity to the target.

Another object of the invention is to provide a camera of the above character which is provided with a cone-shaped nose so that it can be utilized with other equipment in close proximity to the target.

It is another object of the invention to provide a camera of the above character in which a remotely controlled film advance is utilized.

Another object of the invention is to provide a camera of the above character in which a spark gap assembly is utilized having a very low jitter.

Another object of the invention is to provide a camera of the above character in which the film in the film advance mechanism can be readily changed.

Another object of the invention is to provide a camera of the above character utilizing a size solid dielectric in the spark gap apparatus and in which the solid dielectric can be readily changed.

Another object of the invention is to provide a camera of the above character which is relatively small and compact.

Additional objects and features of the invention will appear from the following description in which the preferred embodiments are set forth in detail in conjunction with the accompanying drawings.

BRIEF DESCRIPTION OF THE DRAWINGS

FIG. 1 is a top plan view of a target chamber with a portion of the cover being broken away showing the use of the streak camera with associated apparatus which is schematically illustrated.

FIG. 2 is an enlarged isometric view of the streak camera shown in FIG. 1.

FIG. 2a is an alternate embodiment of the streak camera shown in FIG. 2.

FIG. 3 is a cross sectional view taken along the lines 3—3 of FIG. 2.

FIG. 4 is a cross sectional isometric view of the streak camera incorporating the present invention and which is encircled by the lines 4—4 in FIG. 3.

FIG. 5 is an enlarged cross sectional view of the portion of the streak camera encircled by the lines 5—5 in FIG. 3.

FIG. 6 is an elevational view looking along the lines 6—6 of FIG. 3.

FIGS. 7a, 7b, 7c are parts of cross sectional views looking along the lines 7—7 of FIG. 6.

FIG. 8 is a cross sectional view taken along the lines 8—8 of FIG. 3.

FIG. 9 is a cross sectional view taken along the lines 9—9 of FIG. 8.

FIG. 10 is a cross sectional view taken along the lines 10—10 of FIG. 8.

FIG. 11 is a cross sectional view taken along the lines 11—11 of FIG. 10.

FIG. 12 is a cross sectional view taken along the lines 12—12 of FIG. 11.

DESCRIPTION OF THE PREFERRED EMBODIMENT

The streak camera 11 of the present invention is mounted in a vacuum or target chamber 12 and is utilized for conducting experiments as hereinafter described.

The streak camera 11 is shown more detail in FIGS. 2—12 of the drawings and as shown therein consists of a camera body 13 which is in the form of a hollow cylinder open at both ends. The body is formed of a suitable material such as aluminum. A camera head 14 is mounted on one end of the camera body 13. It is conical in shape and subtends an angle of approximately 60 degrees. As can be seen, particularly from FIG. 3, the portion of the head 14 immediately adjacent the camera body 13 is cylindrical and is flush with the outer surface of cylindrical camera body 13. The head 14 is provided with a cylindrical extension 16 which seats within one end of the body 13. A recess 17 is provided on the outer surface of the cylindrical extension 16 and receives an O-ring 18 which forms a vacuum tight seal with respect to the cylindrical body 13. The head 14 is secured to the cylindrical body 13 through suitable means such as cap screws 19 disposed in recesses 21 provided in the head 14.

A pin hole holder 22 is carried by the conical camera head 14 and is seated within an opening 23 provided in the conical head 14. The holder 22 is provided with a flange 24 which is secured to the end of the conical head 14 by cap screws 26. A snout 27 formed of a suitable material such as brass is carried by the holder 22 and is retained by a set screw 28 that seats in a groove 29 extending longitudinally of snout 27 so that the snout can be adjusted longitudinally of the axis to provide some variation in the magnification of the image onto the X-ray streak tube as hereinafter described. The snout 27 has a tapered outer surface 31. In addition, it is provided with a tapered passage 32 (see FIGS. 3 and 5) that is also conical in shape and increases gradually in diameter from the front to the rear. The passage 32 is defined by a plurality of segmented conically shaped or tapered recesses or serrations 33 of a gradually increasing diameter as shown particularly in FIGS. 3 and 5. The front end of the snout 27 is provided with a recess 34 that receives a small disc 36 which has a pinhole 37 provided therein for viewing a target such as a particle 38 of a type hereinafter described. The recesses or serrations 33 provide a sawtoothed appearing angular thread which decreases in size as the passage 32 approaches the pinhole 37 and serve to reduce scattering of X-rays on the internal walls of the snout 27. The pin hole 37 can be of any suitable size as for example, 10 to 20 microns in diameter. It should be appreciated that if desired, a slit can be utilized in place of the pin hole. The slit would also have similar dimension such as 10 to 20 microns in width, and can have any suitable height or length, as for example, up to one half a centimeter.

A rear cover assembly 41 is provided for closing the other end of the camera body 13 opposite the end closed by the conical head 14. The rear cover assembly 41 consists of a rear cover 42 and a locking assembly 43. The rear cover 42 is provided with a circular generally rear wall 44 and an annular side wall 46 which extends at right angles thereto. The annular side wall 46 is of such a size that it fits within the cylindrical surface 48 of the camera body 13. The annular side wall 46 is provided with downwardly inclined surface 49 that is adapted to engage an O-ring 51 which is seated within an annular groove provided in the surface 48 of the camera body 13. The O-ring 51 is contained within the annular groove 52 by a retaining ring 53 which is carried by the camera body 13. The side wall 46 is provided with a cylindrical portion 54 which is adapted to seat within the retaining ring 53 as shown particularly in FIG. 3.

The locking assembly 43 includes a propeller assembly 55 which consists of three blades 56 which are spaced approximately 120 degrees apart and which are fastened together to form the propeller assembly 55. The assembly is threadedly mounted upon a screw 57 which is rotatably mounted in the rear wall 44 of the rear cover 42. A washer 58 is secured to the screw 57 and is seated in a well 59 in the rear wall 44. It is retained in the wall 59 by a retaining ring 60 seated in the well 59. A large knob 61 is secured to the other end of the screw 57.

An annular recess 62 is formed through the surface 48 of the camera body 13 to the rear of the annular groove 52 therein and is adapted to receive the outer extremities of the blades 56. The camera body 13 is provided with three cutouts or recesses 63 (see FIG. 6) spaced 120° apart which extend into the annular recess 62. In placing the rear cover assembly 41 in place, the rear cover 42 is inserted into the rear extremity of the camera body 13 and the three blades 56 are lined up with the three cutouts 63 and then the rear assembly 41 is pushed inwardly into the camera body 13. Movement continues until the blades are seated within the recess 63. The blades are then rotated by small angle so that they are clear of the cutout 63 and moved to the position shown in solid lines in FIG. 6 in which one of the blades comes into engagement with a socket head screw 64 carried by the rear cover 42. Another socket screw 66 determines the other extreme position of the blades 56 as shown in broken lines in FIG. 6 in which the blades are in registration with the cutouts.

As can be seen from FIG. 7a, when the rear cover 42 is initially slid into the rear extremity of the camera body 13, the rear cover can be easily inserted because the O-ring 51 is relatively loosely held by the retaining ring 53. FIG. 7a shows the movement between the parts when the three-bladed propeller assembly 55 with its blades 56 has been inserted into the annular recess 62. After the three-bladed propeller 55 has been locked into the position shown in FIG. 6, the knob 61 can be rotated to move the rear cover 42 inwardly so that the inclined surface will be moved further inwardly to engage the O-ring 51 as shown in FIG. 7b. This movement is continued until the rear cover 42 is in the position shown in FIG. 7c in which the O-ring 51 is firmly sealed against the annular groove 52 provided in the camera body 13. As can be seen, it is also in sealing engagement with the inclined surface 49 of the rear cover 42 and the retaining ring 53.

When it is desired to remove the rear cover assembly 41, it can be seen that it is necessary to rotate the knob 61 in the opposite direction so that the inclined surface 49 is moved away from the O-ring 51 to release the same to the relatively loose position shown in FIG. 7a. The three-bladed propeller 55 then can be rotated so that its blades 56 are in registration with the cutout 63 and then the rear cover assembly 41 can be pulled outwardly out of the camera body 13.

The type of locking mechanism hereinbefore described serves a dual purpose. By machining a grove for the O-ring which is recessed, there is much less likelihood of the same being scratched during the inward and outward sliding movment of the rear cover 42 during insertion and removal of the same. This helps to insure that a good positive seal will always be formed with the O-ring 51. In addition, by providing a sealing arrangement in which the O-ring is released, the insertion and removal of the rear cover 42 is facilitated.

One of the blades 56 of the three-bladed propeller 55 is provided with a hole 71 through which a laser beam can pass. The hole 71 is adapted to be aligned with a window 72 mounted in a hole 73 provided in the rear wall 44 of the rear cover 42. Means is provided for forming an air-tight seal with the window 72 and consists of an O-ring 74 which is seated in the rear wall 44 and engages the window 72. Window 72 is held in place against the O-ring by retaining ring 76. An electrical feedthrough connector 77 is also mounted in the rear cover 42.

A film transport mechanism 81 is carried by the rear cover assembly 41 and consists of a transport housing 82. The transport housing 82 is formed by a U-shaped channel member 83 with an end plate 84 mounted therein (see FIG. 10). A cover 86 is provided for forming a light tight chamber 87 within the transport housing 82. The cover is held in place by a thumb screw 88 threaded into a post 89 disposed in the chamber 87. Post 89 is secured to the U-shaped channel member 83 by screws 91. The chamber 87 is of such a size that it is adapted to carry a length 92 of 35 mm. film having spaced perforations along both outer margins of the same. The film 92 is carried by first and second 35 mm. cartridges 94 and 96 of a conventional type and are driven by spindles 97 and 98 which are rotatably mounted in the gear housing 101 secured to the bottom side of the transport housing 82. Gears 102 and 103 in the housing 101 are mounted on the lowermost extremities of the spindles 97 and 98. The gears 102 and 103 are adapted to be alternatively engaged by an idler gear 104 carried by a shaft 106 which is mounted upon one end of idler arm 107. The arm 107 is rotatably mounted upon a hub 108. A drive gear 109 is mounted by suitable means such as a press fit on the hub 108. The hub 108 is driven by a suitable motor such as a 5-volt DC motor 111 which is mounted within the transport housing 82. The idler gear 104 can be moved into engagement with either the gear 102 or the gear 103 depending upon the rotation of either the spindle 97 or the spindle 98 to thereby advance or reverse the travel of the film 92.

The film 92 in its travel is guided by four cylindrical film guides 113 rotatably mounted upon post 114 carried by the plate 116. The plate 116 is secured to the bottom wall of the U-shaped channel member 83 by screws 117.

An image intensifier tube 121 is provided with a fiber optic face plate 122. Means is provided for urging the film as it travels to the rollers 113 so that it is moved to engagement with the fiber optic face plate 122 and consists of a pusher pad 123 formed of a suitable material such as polyurethane foam. The pusher pad 123 is carried by a plunger 124 of a solenoid 126 mounted upon the plate 116. Means is provided for yieldably urging the pusher pad 123 into engagement with the film 92 and the film 92 into engagement with the fiber optic faceplate 122 and consists of a spring 127 mounted on the plunger 124 and having one end engaging the pad 123 and having the other end engaging the solenoid 126. A slotted interruptor switch 128 is provided within the transport housing and is of a eonventional type and is utilized for counting the number of perforations in the edge of the film 92 as it is advanced. It can be readily seen that by counting the number of perforations that pass, it is possible to precisely ascertain how far the film has been advanced.

A laser triggered solid dielectric spark gap assembly 131 is provided within the camera body 13. It consists of a block 132 formed of a suitable insulating material such as Lucite. The block 132 is provided with a central bore 133 so that the laser beam 134 can pass therethrough. The other end of the block 132 is provided with a relatively large bore 136 which extends inwardly to the other end and which is in communication with a smaller bore 137 also provided in the block 132. The bores 136 and 137 are concentric with the bore 133. A body 138 formed of a suitable conducting material such as brass is disposed within the large bore 136. The body 138 is provided with a threaded bore 139 and another bore 141 which are separated by a wall 142. The wall 142 has a hole 143 formed therein. A lens holder 146 is threaded into a brass collar 147 which is threaded into the bore 139. The lens holder 146 carries a lens (not shown) which is of short focal length for focusing the laser beam at a point as hereinafter described.

A movable contact electrode assembly 148 is mounted in the bore 141 and includes a spool-like armature 149 which is slidably disposed within the bore 141. A star-shaped contact member 151 formed of a suitable material such as beryllium copper is secured to the armature 149 by a generally cylindrical electrode 152 formed of a suitable material such as molybdenum. The outer extremities of the star-shaped contact member 151 are secured to the brass body 138 by a suitable means such as welding so that there is good electrical contact between the body 138 and the contact member 151. Electrode 152 serves to retain the center part of the contact member 151 in engagement with the spool-like armature 149. The star-shaped contact member 151 is formed of a springy material so that the contact electrode 152 carried thereby is urged towards a fixed contact assembly 153 hereinafter described.

Means is provided for moving the movable electrode assembly 148 away from the fixed contact assembly 153 and consists of a forked arm 156 which extends on both sides of the spool-like armature 149 (see FIG. 3). The arm 156 extends through a slot 157 provided in the block 132. The arm 156 is pivotally mounted on a pin 158 carried by the block 132. The outer end of the arm 156 is engaged by a plunger 159 of a solenoid 161 which is secured to a bracket 162 mounted on the block 132. The plunger 159 is of a pusher type and when it is energized, it pushes the outer extremity of the arm 156 upwardly as viewed in FIG. 9 so that the moveable electrode assembly 148 is moved away from the fixed electrode assembly 153 for the purpose hereinafter described.

The electrode 152 is provided with a small hole 163 which is in registration with a bore 164 provided in the electrode. The axis of the bore 164 is concentric with a hole 166 which extends through the spool-like armature 149.

The other or fixed contact assembly 153 consists of a contact member in the form of a screw 171 in which the bead 172 of the screw serves as the contact surface. The screw 171 extends through an L-shaped slide 173 formed of a suitable material such as plastic. The slide 173 is slidably mounted in the block 132 and is yieldably retained therein by a cover plate 174 that is secured to the block 132. The slide 173 is provided with a recess 176 which has a spring 177 mounted therein. One end of the spring 177 is engaged by a tab 178 provided on the cover plate 174. By providing such construction it is possible to move the screw 171 with its contact surface away from the electrode 152. The screw 171 is threaded into a nut 179 which is seated in one end of the slide 173 so that the screw 171 is firmly held in place. A spring-like contact sleeve 181 is carried by the outer extremity of the screw 171. It is adapted to engage a cup-shaped contact receptacle 182 formed of a conducting material. The receptacle 182 is carried by another cup-shaped member 183 formed of an insulating material which is secured to the head 14. The conducting receptacle 182 is electrically connected to a flexible copper strap 184 by a suitable connection such as solder 186. The flexible copper strap 184 is connected to one electrode of a streak tube 187.

It can be seen that the connection between the screw-like electrode 171 and the receptacle 182 is a slide fit so that the rear cover assembly 41 can be removed from the camera body 13 and carry with it the film transport mechanism 81 and the solid dielectric spark gap assembly 131 merely by separating the two parts. Similarly, when the rear cover assembly 41 is inserted into the camera body 13, the screw-like electrode 171 can be readily inserted into the fixed receptacle 182.

A strip 191 formed of a suitable dielectric material such as Mylar is adapted to be inserted between the head 172 of the screw 171 and the electrode 152. A supply of strip 191 is provided and means is provided for progressively advancing the strip between the electrodes. This means consists of a supply spool 192 and a take-up spool 193 rotatably mounted in cylindrical bores 194 provided in the block 132. The spools 192 and 193 are retained within the bores by a cover plate 196 secured to the block 132 by screw 197 (see FIG. 9). A supply of the Mylar film 191 is carried by the spool 192 and is supplied from the spool through a slot 198 provided in the body 132 and then extends outwardly around the outside of the block 132 over the top of the block 132 between the contact elements or electrodes 152 and 171 and then down the other side of the block 132 through another slot 199 to the take-up spool 193. The take-up spool 193 is driven by a shaft 201 which extends through a bushing 202 provided in the block 132. The shaft 201 also extends through a motor mounting bracket 203 that is secured to the block 132. A worm gear 204 is secured to the shaft 201 and is driven by worm 206. The worm 206 is mounted on the output shaft 207 of a small motor 208 of a conventional type such as a 5-volt DC motor with a gear reduction provided therein. Means is provided for counting the revolutions of the shaft 201 which drives the take-up spool and consists of a small disc 209 which is secured to the shaft 201 and rotates with the shaft 201. The disc 209 is provided with a plurality of holes 211 spaced circumferentially around the outer margin of the disc 209. A slotted switch 212 of the type hereinbefore described is utilized for counting the number of holes which pass through the slotted switch and is carried by a bracket 213 secured to bracket 203.

By way of example, the Mylar utilized for the strip 191 in one embodiment of the invention had a width of approximately two inches and had a thickness of one mil. The length of the Mylar strip was approximately 100 inches which gave the capability of giving at least 100 shots of the type hereinafter described before it was necessary to reload the Mylar. In the mechanism hereinbefore described, it can be seen that it is only possible to advance the Mylar strip in one direction. Thus the Mylar strip is taken from the supply reel 192 and supplied into the take-up reel 193. As soon as all the strip has been moved from the supply reel to the take-up reel, it is necessary to reload a new strip of Mylar into the solid dielectric spark cap assembly 131.

The Mylar can be loaded into the solid dielectric spark gap assembly 131 by removing the rear cover assembly 41 and taking with it the film transport mechanism 81 and the spark gap assembly 131. The cover 196 can be removed and thereafter the supply and take-up spools 192 and 193 can be removed. The supply spool 192 can be put in place and the Mylar can be readily threaded between the contact electrodes 152 and 171 by engaging the slide 173 and moving it against the force of the spring 177 to separate the contact elements and to make it possible to readily insert the Mylar strip in the same and to connect it to the take-up spool 193. This arrangement makes it necessary to operate the solenoid 161 in order to load the Mylar into the gap provided between the electrodes 152 and 171. In operation of the solenoid 161, it has been found that it is necessary to move the armature by a very small amount, i.e. 10 to 20 mils, in order to relieve the pressure sufficiently between the contact elements so that the Mylar strip 191 is not scratched or otherwise damaged when it is moved.

It should be appreciated that the electrical path provided in the solid dielectric spark gap assembly 131 provides a low inductance path for a suitable negative voltage as for example, a minus 5 kilovolts for the streak tube 187 to operate the same as hereinafter described. A laser pulse vaporizes the Mylar and forms a small hole therein to provide a low conductance path for the negative voltage.

By way of example, it has been found desireable to form the electrodes 152 and 171 so that they are approximately ⅜ of an inch in diameter so as to provide a low inductance. With electrodes of such diameter, it is desirable to move the Mylar strip 191 a sufficient distance so as to provide a minimum of approximately 10,000 volts in breakdown capabilities between the holes provided in the Mylar film by the spark gap assembly 131 as hereinafter described. To accomplish this, it is desirable to move the strip by approximately ¾ of an inch to an inch. This movement is controlled by conventional electronics by ascertaining the movement of the film by counting the holes 211 in the disc 209 by the slotted switch 212.

The solid dielectric spark gap assembly 131 is removably secured to the film transport mechanism 81. Thus as is shown particularly in FIGS. 3 and 8, a retainer plate 216 is secured to the lower side of the U-shaped channel member 83. Another retainer plate 217 is secured to the block 132. Cooperative means in the form of a dove-tailed arrangement shown particularly in FIG. 8 is provided for making a slidable connection between the two plates 216 and 217. In this manner, when desired, the solid dielectric spark gap assembly 131 can be removed and separated from the film transport mechanism 81.

Suitable power supplies such as a 10 KV power supply 221 and a 5 KV power supply 222 are disposed within the camera body 13 in the space above the film transport mechanism 81.

A retainer plate 226 is secured to the head 14 by suitable means and screws 227. The retainer plate 226 is formed of a suitable material such as black Lucite or, alternatively, a glass filled machinable dark black epoxy cast material. As can be seen, the retainer plate 226 is of such size that it extends across the rear of the housing 14. The retainer plate 226 is provided with a cylindrical extension 228 housing a bore 229 extending therethrough which is in general alignment with the film transport mechanism 81.

An image intensifier 231 of a conventional type is mounted in a well 232 provided in the extension 228 concentric with the bore 229. One end of the streak tube 187 is also seated within the cylindrical extension 228 and is in direct intimate contact with the image intensifier 231. The other end of the streak tube 187 is seated within an annular recess 233 provided in one end of a cylindrical insulating member 234 formed of a suitable material such as black Lucite. The member 234 is provided with a cylindrical bore 236 which has an axis which is coincident with the axis of the annular recess 233. An O-ring 237 is mounted within the recess 233 and is adapted to be engaged by the outer extremity of the streak tube 187 to form an air-tight seal between the streak tube 187 and the insulating member 234. The other end of the insulating member 234 is provided with another O-ring 238 which is adapted to seat against the forward extremity of the nose cone housing 14 to provide an air-tight seal between the interior of the bore 236 and the exterior of the insulating member 234.

From the foregoing it can be seen that the retainer plate 226 serves several functions. It houses the image intensifier 231 and the rear extremity of the streak tube 187. It also provides protection for the front extremity of the film transport assembly 81. In addition, it serves to align the film 92 of the film transport assembly so that the film is centered on the fiber optic output of the image intensifier 231.

The retainer plate 226 also provides the means to hold the image intensifier 231 and the streak tube 187 tightly against the separating insulator 234. The pressure provided by the retainer plate 226 also ensures that good O-ring seals are maintained so that the bore 236 which is subject to a high vacuum through the passage 32 will be maintained while the exterior of the streak tube 187 can remain at atmospheric pressure. The image intensifier 231 is encapsulated in a silicon rubber type substance to provide a cushion for the streak tube 187 and to provide for thermal expansion. The retainer plate 226 also serves to prevent unwarranted access into the expensive components such as the image intensifier 231 and the streak tube 187. The insulating member 234 serves to insulate the metal nose cone 14 and the metal camera body which are at ground or 0 volts from a high voltage in the vicinity of 10,000 volts applied to the photo cathode of the streak tube 187.

The construction of the streak tube 187 is shown in detail in FIG. 4 and as shown therein consists of an envelope or a body 251 formed of a suitable insulating material such as Pyrex glass. A pair of deflection plates 252 and 253, also called beam electrodes, are provided within the envelope or body 251. These plates are formed of a suitable material such as Kovar. As shown, the plates 252 and 253 can be formed to provide a curved profile as viewed in cross section and are formed from plate material having a width of approximately 2 centimeters and a thickness of approximately 1/16th of an inch.

The deflection plate 252 extends through the glass envelope 251 and is connected to the flexible copper strip 184 extending out of the solid dielectric spark gap assembly 131. As shown, the deflector plate 252 is supported by the glass envelope 251 and is therefore insulated from the remainder of the parts of the streak tube 187.

The plate beam electrode 253 is supported by a curved support plate 254 which is secured to the plate 253 by suitable means such as spot welding. The curved support plate 256 is provided with a moon-shaped cutout 257 to permit vacuum communication through the plate 256. An annular seal 258 formed of a suitable material such as Kovar forms a bond between the plate 256 and the glass envelope 251. The deflector plates 252 and 253 which also can be called sweep electrodes have their inner surfaces, which are facing each other polished and then coated with a suitable high-conducting metal such as gold.

It will be noted that the sweep electrodes 252 and 253 are formed so that they have asymmetric profiles which are curved with respect to the tube axis 261 for reasons hereinafter pointed out. In other words, as shown in the drawing, the sweep electrode 252 is curved away from the tube axis 261 at an angle which is progressively greater than that for the sweep electrode 253. The electrodes 252 and 253 are also positioned in such a manner that they form an entrance slot 262 having a predetermined spacing, as for example, 0.125 inches. The disc-like support plate 256 is provided with the slot 263 therein which is opposite the slot 262.

A micro-channel plate collimator 264 hereinafter called MCP collimator is secured to the disc-like support plate 256 so that it covers the slot 263. Channel plate collimators have heretofore been utilized and serve as continuous channel electron multipliers in which each electron cascades and is multiplied as it travels through the collimator.

In one method for fabricating such channel plate collimators, two types of glass are utilized in which one serves as an external cladding for a giber of the other glass. A plurality of these cladded fibers are drawn down together to make a bundle of the same and then these are sliced off to the desired thickness. An etch is utilized to remove the internal glass so there remains the cladding to provide glass tubules which form the channels or bores of the channel plate. The channel plate is then fired to bring out the lead in the glass, which often is approximately 90% of the glass, to the interior surfaces of the glass tubules so that the surfaces of the glass serve as a relatively good conductor to inhibit any charge buildup on the glass. The channel plates are then fired to oxidize the lead to form lead oxide. To inhibit the lead oxide from acting a a secondary emitter when the electrons pass through the channels, the exterior flat surfaces of the channel plate, as well as the interior surfaces of the channels to a depth of several diameters into each bore or channel are plated with a good conducting material such as Inconel. This is accomplished by evaporating the Inconel onto the surfaces to a sufficient thickness so that it is opaque to visible light. The formation of the bore in this manner can be very precise so that very high aspect ratios, i.e. length with respect to diameter, can be obtained in excess of 100 to one, as for example 160-175 to 1.

Thus, the channel plate collimator can be provided with the plurality of bores 266 which are formed into an array 267 having a length of approximately 1 and ½ centimeters and having a width of approximately ⅛th of a centimeter. The channel plate can have any suitable thickness, as for example, approximately 0.08 inches.

At the present time, it is relatively easy to obtain bores or channels 266 which are square, having a dimension of approximately 8 microns on a side, or in other words, having a dimension which is approximately 12 microns from flat to flat. The corners of the channel plate collimator can be radiused if desired.

It will be noted from FIG. 4 that the bores or channels 266 of the collimator 264 are inclined at an angle from the tube axis 261 in a suitable angle ranging from 5 to 15 degrees but preferably in the vicinity of approximately 10 degrees. A photocathode and slit structure 271 forms a part of the streak tube 187 and is carried by and is bonded to a ring 272 formed of a suitable insulating material such as a ceramic. The ring 272 is in turn bonded to the disc-like support plate 256. The photocathode and slit structure 271 consists of a circular plate 273 formed of a suitable material such as Monel which has machined therein a rectangular slot 274 that tapers into a knife-edge slit 276. The slit has a suitable dimension such as a width of approximately 100 micrometers and a length of approximately 1 centimeter.

A vacuum tight input window covers the slit 276 and consists of an iron-free beryllium foil 277 of a suitable thickness, as for example, from 0.0003 to 0.0005 inches. This foil 277 is secured to the Monel structure 271 by a suitable means such as Indium. The photocathode is formed of a layer 278 of a suitable material such as gold, which is evaporated on to the foil 277 to a suitable thickness, as for example, 150 to 175 angstroms. It will be noted that the plane in which the slit 276 lies is also at an angle with respect to the tube axis 261, as for example, an angle range from 5 to 15 degrees and preferably at an angle of 10 degrees so that the surface 281 in which the slit line is substantially parallel to the forward and rear surfaces of the channel plate collimator 264.

As hereinafter pointed out, this off-axis arrangement is utilized to eliminate direct feedthrough of visible photons as well as X-rays. Because of this tilting of the photocathode and the channel plate so as to make the tube blind to the direct feedthrough of photons, the photoelectrons which are emitted by the photocathode and pass through the collimator are moving in a direction which is off-axis of the tube axis 261. In order to maintain deflection sensitivity, the plates 252 and 253 are made asymmetric to the tube axis as hereinbefore described. In other words, the electrons will come out of the collimator and will move closer to the beam electrode 252 than the beam electrode 253, and for that reason, the beam electrode 252 is curved downwardly more sharply than the beam electrode 253 is curved upwardly so that the plate 253 will exert a greater influence upon the electrons so that the trajectory of the electrons will be brought back into alignment with the tube axis 261.

It has been found that the major region of sensitivity provided by the beam electrodes 252 and 253 is within approximately the first one quarter of the length of the electrodes 252 and 253. The remaining portions of the plates or beam electrodes are much less effective. For this reason it has been found desirable to greatly shorten the lengths of the beam electrodes so as to make it possible to provide a much shorter streak tube.

The electrons in the electron beam after traversing through the electric field created between the beam electrodes 252 and 253 impinge upon a layer 286 formed of a suitable material such as aluminum which is deposited over a screen 287 formed of a suitable material such as a P-11 phosphor. The phosphorous screen 287 is deposited on the rear surface of a fiber optic output window 288 of a conventional type. The fiber optic output window 288 couples directly into the image intensifier 231. The fiber optic window 288 is covered by a ring 289 which is supported by a flange 291 formed of a suitable material such as Kovar. The Kovar ring 291 is bonded by seals 292 to the glass envelope or body 251.

A tab 296 is secured to the ring 291 for making electrical connection thereto. Similarly, a tab 297 is secured to the disc-like support plate 256 and a wire 298 is connected to the Monel structure 271. A potting compound 299 is provided which covers the seals 292 and 258 as well as ring 291 and the outer extremity of the disc-like support plate 256 so that only tabs 296 and 297 and the wire 298 extend outwardly therefrom. The tabs 296 and 297 are connected to ground as is the wire 298. The beam electrode 252 is connected to a suitable source of voltage as for example a minus 5 KV pulsed at a rate of approximately 150 pulses per second and the photocathode 277 is connected to a suitable source of voltage such as minus 10 KV.

It has been found by using the considerations set forth above that a relatively compact streak tube can be manufactured which can be described as proximity focused streak tube because of its relatively short dimensions between the photocathode and the phosphor screen. By way of example, one tube constructed in accordance with the present invention had a length of approximately 3 centimeters from the photocathode to the phosphorous screen. The fiber optic window 288 had a diameter of 25 millimeters. The tube had an overall diameter of approximately 1.7 inches and had an overall length of approximately 2 inches.

Operation of the streak camera 11 can new be briefly described in conjunction with a typical experiment such as that shown in FIG. 1. The vacuum chamber 12 as shown in FIG. 1 is of a conventional cylindrical type and consists of a cylindrical vessel 301 which is provided with a removable lid 302. The vessel 301 defines chamber 303 which is adapted to be pumped down to a desired vacuum. Windows 306, 307 and 308 are provided on the vessel 301. First and second lasers 311 and 312 are provided for introducing laser beams 313 and 314 through the windows 306 and 308 respectively. The lasers 311 and 312 are of a conventional type and typically have a wavelength of approximately 1.06 microns and typically have an energy level from one joule to 15 to 20 joules per beam.

The beams 313 and 314 are focused by large diameter lenses 316 and 317 onto a very small laser fusion target 38. The lenses 316 and 317 are adapted to be remotely positioned to focus the laser beams down to a small spot onto the target 38. Typically, target diameters can be in the vicinity of 50 microns. The targets 38 can be formed of a suitable material such as nickel or glass. They may be hollow or may be filled. It is intended these targets produce X-rays which can be viewed by the camera 11.

The nose of the camera 11 is conically shaped as hereinbefore described so as to make it possible to bring the camera into very close proximity with the target 38 to obtain a maximum collection angle for the X-rays emitted from the target after it is struck by the laser beams. Because it is often necessary to place other instruments in the vicinity of the target 38, it is desirable to minimize as much as possible, the amount of solid angle which is utilized by the camera. Thus by way of example in an experiment, an X-ray pin hole camera 321 can be utilized as well as a neutron detector 322 and an ion detector 323.

The camera 11 is connected by a ribbon cable 326 through a feedthrough fitting 327 to a control console 328. The control console is adapted to be connected by plug 329 to a suitable source of voltage such as for example 110 volts A.C. As hereinbefore described, the camera 11 is constructed in such a way that it is unnecessary to remove the camera 11 when changing the 35 millimeter film or when it is necessary to change the solid dielectric which is utilized in the spark gap assembly 131. This is true because the back or cover assembly 41 of the camera can be readily removed from the camera body 13 and thereafter the 35 millimeter film can be readily replaced as can the solid dielectric.

The camera body 13 is constructed in such a manner that it can be utilized within a vacuum chamber. In other words, the housing is constructed so that it will maintain a positive pressure within the camera body even though it is positioned in a high vacuum environment, typically $10^{-5}$ to $10^{-6}$ Torr. The environment within the camera 11 is maintained at atmospheric pressure so as to avoid corona or geisler effects from the high voltages which are necessary to operate the proximity focused streak tube 187.

The laser beam 313 from the laser 311 is introduced into the chamber 303 by means of a first or front surfaced mirror 331. The beam 314 from the laser 312 passes through a beam splitter 332. A portion of the beam is directed into the chamber 303 through a first surface mirror 333. A portion of the energy from the beam 314 passes from the beam splitter 332 and is diverted to from a trigger beam 334 which strikes a first surface mirror 335. The trigger beam is reflected onto a trigger timing adjustment first surface mirror 336 which is utilized for varying the length of the path for the trigger beam as it is directed onto another mirror 337 and still another mirror 338 through the window 307 into the rear of the camera 11 and through the window 72 and into the solid dielectric spark gap assembly 131 to trigger the same.

The solid dielectric spark gap assembly 131 forms an integral part of the present camera because it makes it possible to provide the very high trigger speeds which are necessary because of the high streak velocity of the electron beams within the proximity focused streak tube 187. Typically in an 18 millimeters streaking at 10 pico seconds per millimeter provides an output record length of 180 pico seconds. In order to obtain excellent information during each experiment, it is necessary that the jitter be reduced to a small proportion of the record length of 180 pico seconds. It has been found typically that the jitter in the solid dielectric spark gap assembly 131 was approximately one-half the rise time of the laser pulse. Thus where the laser pulse has a duration of 70 pico seconds, jitter of less than approximately 30 pico seconds has been obtained. The target beam is derived from the main laser beam. This is very advantageous because it makes it unnecessary to derive a very low jitter pulse for the spark gap assembly. The necessary precision timing for the trigger pulse can be readily obtained by adjusting the position of the trigger timing mirror 336.

It is apparent from the foregoing that there has been provided a proximity focused streak tube and a camera using the same which has many advantages. By providing a slanted channel plate, i.e. one which is tilted from the axis of the camera, the camera is made so that it is blind to direct feedthrough of X-rays and visible light. In other words, the X-rays and/or the visible light cannot go directly to the phosphorous screen. By the use of asymmetric beam electrodes, it is possible to accommodate the tilting of the channel plate. The tube is of very short length to maintain resolution, i.e. so that the electrons do not have time to drift apart. The proximity focused streak tube provides good resolution with a large dynamic range. The X-rays can readily pass through the aluminum layer which serves as a filter to keep out extraneous energy as for example visible light and other stray photons.

In addition, the camera itself has many desirable features. The conical shaped nose makes it possible to minimize the amount of space required by the camera in experiments. The remotely controlled advance camera makes it possible to conduct experiments without breaking the vacuum in the vacuum chamber. In addition, the solid dielectric spark gap generator can be operated remotely.

It should be appreciated that the streak tube and the camera utilized in the same disclosed herein has other applications other than the experimental type of apparatus shown in FIG. 1. For example, it can be utilized in KMS fusion experiments incorporating a scattering chamber. In such experiments, the laser beams which are introduced into the chamber impinge upon huge mirrors within the chamber which occupy a large solid angle within the chamber and make it impossible for the camera to be positioned in close proximity to the target. For this reason, the camera is mounted in the wall of the scattering chamber. When this is done, a pin hole structure (not shown) can be utilized for imaging the target onto the camera. Alternatively as shown in FIG. 2a, a grazing incidence mirror structure 351 can be utilized. This structure 351 is substituted for the holder 22 and the snout 27 and consists of a cylindrical body 352 which carries ellipsoidal mirrors 353 therein which are adapted to focus the X-rays from the target onto the photocathode of the proximity focused streak tube 187.

What is claimed is:

1. In a proximity focused streak tube, a photocathode for converting photon images into photoelectrons, a phosphorous screen for receiving said photoelectrons, said photocathode and said screen for receiving said photoelectrons, said photocathode and said screen defining a longitudinal tube axis, a channel plate having a plurality of substantially parallel bores therein, the channel plate being disposed in close proximity to the photocathode so that the bores in the channel plate are inclined at an angle with respect to the longitudinal tube axis, means for applying a voltage differential between the photocathode and the channel plate to cause electrons to be extracted from the photocathode and to travel in paths through the bores in said channel plate to said phosphorous screen, said bores in said channel plate being arranged so that said photons and photoelectrons cannot pass directly from said photocathode directly through said channel plate to said phosphorous screen, first and second spaced apart beam electrodes disposed on opposite sides of the tube axis between the channel plate and the phosphorous screen and having curved profiles, one of said beam electrodes being curved away from the tube axis at an angle which is progressively greater in a direction away from the channel plate than that of the other beam electrode and means for applying a voltage differential between said beam electrodes to cause the photoelectrons to move in directions across the screen, said beam electrodes being arranged asymmetrically of the tube axis to compensate for the inclination of the bores in the channel plate with respect to the tube axis.

2. A streak tube as in claim 1 wherein said photocathode lies in a plane which is a plane substantially parallel to the channel plate.

3. A streak tube as in claim 2 wherein said channel plate is provided with first and second parallel surfaces and in which the bores are normal to the first and second parallel surfaces of the channel plate.

4. A streak tube as in claim 2 together with means forming a slit in relatively close proximity to the photocathode through which the photons must pass.

5. A streak tube as in claim 4 wherein said slit is formed in a structure formed of a conducting metal and wherein said photocathode is carried by the conducting metal and covers the slit.

6. A streak tube as in claim 1 together with a fiber optics face plate and wherein said phosphorous screen is carried by the fiber optics faceplate.

* * * * *